(12) United States Patent
Martin et al.

(10) Patent No.: US 8,437,831 B2
(45) Date of Patent: May 7, 2013

(54) METHOD FOR OPERATING A HYBRID MEDICAL IMAGING UNIT COMPRISING A FIRST IMAGING DEVICE OF HIGH SPATIAL RESOLUTION AND A SECOND NUCLEAR MEDICINE IMAGING DEVICE OF HIGH SENSITIVITY

(75) Inventors: Diana Martin, Herzogenaurach (DE); Sebastian Schmidt, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 1510 days.

(21) Appl. No.: 12/000,836

(22) Filed: Dec. 18, 2007

(65) Prior Publication Data

US 2008/0156994 A1    Jul. 3, 2008

(30) Foreign Application Priority Data

Dec. 22, 2006  (DE) .......................... 10 2006 061 078

(51) Int. Cl.
*A61B 5/05* (2006.01)

(52) U.S. Cl.
USPC ........... 600/411; 600/407; 600/410; 600/436; 324/309; 324/318; 324/322

(58) Field of Classification Search .................. 600/407, 600/410, 411, 436; 324/309, 318, 322
See application file for complete search history.

(56) References Cited

U.S. PATENT DOCUMENTS

| | | | | |
|---|---|---|---|---|
| 4,939,464 A | * | 7/1990 | Hammer | 324/318 |
| 7,286,867 B2 | * | 10/2007 | Schlyer et al. | 600/407 |
| 7,323,874 B2 | * | 1/2008 | Krieg et al. | 324/318 |
| 7,522,952 B2 | * | 4/2009 | Krieg et al. | 600/411 |
| 7,626,389 B2 | * | 12/2009 | Fiedler et al. | 324/309 |
| 2003/0001097 A1 | | 1/2003 | Garrard et al. | |
| 2003/0179918 A1 | | 9/2003 | Kohler | |
| 2005/0113667 A1 | * | 5/2005 | Schlyer et al. | 600/411 |
| 2005/0154292 A1 | | 7/2005 | Tank | |
| 2006/0266947 A1 | | 11/2006 | Krieg et al. | |

(Continued)

FOREIGN PATENT DOCUMENTS

| | | |
|---|---|---|
| DE | 10211485 A1 | 9/2003 |
| DE | 10357203 A1 | 7/2005 |

(Continued)

OTHER PUBLICATIONS

Slates, R. et al., "Assessment of Artifacts in Simultaneous PET and MR Imaging", Nuclear Science Symposium, 1997. IEEE, vol. 2, No., pp. 1357-1360 vol. 2,Nov. 9-15, 1997; Others.

(Continued)

*Primary Examiner* — Brian Casler
*Assistant Examiner* — Nasir S Shahrestani
(74) *Attorney, Agent, or Firm* — Harness, Dickey & Pierce, P.L.C.

(57) ABSTRACT

A method is disclosed for operating a hybrid medical imaging unit including a first imaging device of relatively high spatial resolution and a second nuclear medicine imaging device of relatively high sensitivity that respectively acquire imaging measurement signals from a common examination volume. In at least one embodiment, the method includes determining the duration of the measurement signal acquisition of one imaging device as a function of the duration of the measurement signal acquisition of the other imaging device, which is defined by the occurrence of a specific truncation criterion.

10 Claims, 1 Drawing Sheet

U.S. PATENT DOCUMENTS

| | | | |
|---|---|---|---|
| 2007/0102641 A1 | 5/2007 | Schmand et al. | |
| 2008/0137930 A1* | 6/2008 | Rosen | 382/131 |
| 2008/0284428 A1* | 11/2008 | Fiedler et al. | 324/307 |
| 2011/0105892 A1* | 5/2011 | Peligrad | 600/420 |

FOREIGN PATENT DOCUMENTS

| | | |
|---|---|---|
| DE | 10 2005 023 907 A1 | 12/2006 |
| JP | 2004181204 A | 7/2004 |
| JP | 2004530916 A | 10/2004 |
| JP | 2008525161 A1 | 5/2007 |
| WO | WO 2006071922 A2 | 7/2006 |

OTHER PUBLICATIONS

German Office Action.

* cited by examiner

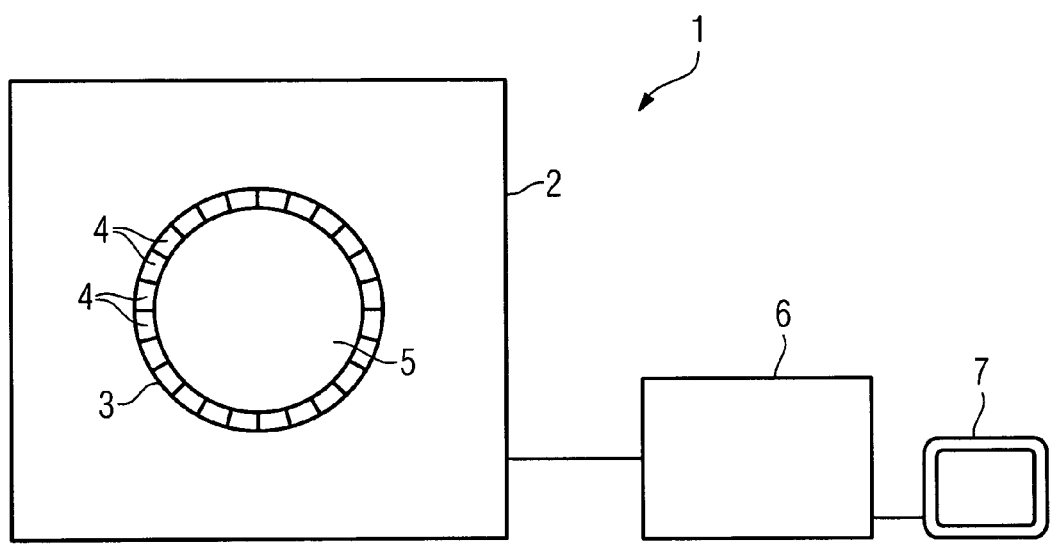

METHOD FOR OPERATING A HYBRID MEDICAL IMAGING UNIT COMPRISING A FIRST IMAGING DEVICE OF HIGH SPATIAL RESOLUTION AND A SECOND NUCLEAR MEDICINE IMAGING DEVICE OF HIGH SENSITIVITY

PRIORITY STATEMENT

The present application hereby claims priority under 35 U.S.C. §119 on German patent application number DE 10 2006 061 078.4 filed Dec. 22, 2006, the entire contents of which is hereby incorporated herein by reference.

FIELD

Embodiments of the invention generally relate to a method for operating a medical imaging unit. For example, the medical unit may be one including a first imaging device of high spatial resolution and a second nuclear medicine imaging device of high sensitivity, that respectively acquire imaging measurement signals from a common examination volume.

BACKGROUND

Hybrid imaging units are increasingly gaining importance in the field of medical imaging, this being so because they make it possible to be able to examine a patient in a very short time, sometimes even without repositioning, with the aid of two different modalities, that is to say to be able to compile image information with the aid of two different imaging devices. Such hybrid imaging units in this case include a first imaging device of high spatial resolution, for example a computer tomograph or a magnetic resonance machine, and a second, in the present case, nuclear medicine imaging device of high sensitivity for example for PET (position emission tomography) or SPECT (single photon emission computed tomography).

Both methods are tomographic methods that show in the body the distribution of a radionuclide, that is to say a radiopharmaceutical, given to the patient. Such radionuclides have the property of accumulating intensively at specific pathological zones. PET or SPECT imaging methods permit the acquisition of the radionuclide distribution in the body, while corresponding images that finally show probability distributions and constitute an "activity card" can be determined from the acquired measurement signals and displayed. The mode of operation of these methods is known in principle, and there is no need to go into this in more detail.

It is particularly expedient to combine a first imaging device in the form of a magnetic resonance machine with a second imaging device in the form of a PET device. The point is that magnetic resonance tomography permits a very high spatial resolution, on the one hand, while not influencing the PET measurement, on the other hand. As a result, it is possible to arrange the PET detectors in the interior of the cylindrical patient aperture of a conventional magnetic resonance system such that both can measure using the same isocenter, and is even possible for both measurements to run simultaneously. The PET examination furthermore delivers very informative images, and this is to be ascribed to the production of the measurement signals (time-resolved detection of gamma quanta). What is involved here is a coincidence measurement method of high counting yield and thus of very high sensitivity.

The combination of a magnetic resonance system with a PET or SPECT imaging device is particularly advantageous, since there is the possibility here of simultaneously measuring with both modalities, since the two modalities are based on completely different measurement principles and do not influence one another. The PET or SPECT detectors are arranged in the interior of the patient aperture of the magnetic resonance system, and thus clad the latter such that the PET or SPECT imaging device and the magnetic resonance imaging device can measure isocentrically and scan the same examination volume.

However, it disadvantageous in this case that the protocols of the various imaging modalities that are processed in the course of the respective measurement and provide the basis for the respective measurement by determining the parameters have different measuring times, that is to say, for example, the PET measurement proceeds more quickly than the magnetic resonance measurement. The PET image is therefore acquiring no further data while the MR measurement is still running. Conversely, the magnetic resonance system is idle when it has finished before the end of the PET measurement. The respective imaging device is therefore fundamentally ready to operate but is not working because the original measurement protocol has already been completely processed. This is, however, inefficient with regard to the level of capacity utilization of the hybrid imaging unit.

SUMMARY

In at least one embodiment of the invention, a method is specified that enables a more efficient operation leading to a better system capacity utilization in conjunction with the possibility of improved imaging.

In at least one embodiment of the invention, the duration of the measurement signal acquisition of one imaging device is determined as a function of the duration of the measurement signal acquisition of the other imaging device, which is defined by the occurrence of a specific truncation criterion.

In accordance with the method according to at least one embodiment of the invention, the measuring time of an imaging modality is fixed during the examination with the aid of the duration of the measuring time for the other imaging modality, that is to say dynamic controls are performed of the examination period of one imaging device on the basis of imaging data, that is to say measurement results, of the other imaging modality. The operation of the firstly finished imaging device is therefore no longer ended after a single processing of the measurement protocol, but is flexible and can be extended dynamically, and so the measurement is begun anew. The result of this is that the respective imaging device acquires essentially more image data, and this is naturally beneficial to the imaging quality which can partly be substantially raised thereby.

If, for example, a magnetic resonance measurement sequence in accordance with the corresponding measurement protocol for examining the target volume has a duration of 20 minutes, and the measuring time of the PET imaging device for scanning the same volume is 5 minutes, it follows that the PET acquisition is concluded substantially quicker, assuming that the two imaging devices start measuring at the same instant. According to at least one embodiment of the invention, there is thus the possibility here of automatically extending the PET measuring time, for example to the maximum measuring time that is also required by the MR system, that is to say 20 minutes here. The PET imaging device can thus acquire an extra multiple of measurement signals and thus image data, such that it is possible to attain a substantially better image quality with a substantially better signal-tonoise ratio. This procedure is not disadvantageous to the patient himself, since no burdens of any kind are associated with a PET measurement.

In the reverse exemplary case, for example, the measuring time of a PET image recording is planned until a specific number of measurement signals, that is to say here the decay events, have been registered via the PET detectors. This time is a function of unknown variables (activity of the radionuclides (tracers), the patients etc.), and is therefore not known in advance.

The assumed measuring time of the MR scanning is substantially shorter in accordance with the protocol thereof. By way of example, this MR measurement sequence is repeated until, for example, in time series after the application of a contrast agent, the PET imaging device signals that the truncation criterion has been reached, and so here that the predetermined number of events has been reached, and thus signals the end of the PET examination. Subsequently, for example, the MR sequence measurement currently running can still be conducted to the end, after which both examinations are ended and, for example, it is possible to proceed to the next table position.

In both cases, substantially more image signals and thus image relevant information is available on the part of the imaging device respectively extended in measuring time, and so it is possible to attain a substantial improvement in image quality. Again, the functionalities and thus the performances of the individual imaging devices are substantially more efficiently used since, compared with the previous mode of operation, they are operated substantially more frequently and over a long duration.

Different refinements are conceivable with regard to the truncation criterion used. In a first alternative of an embodiment of the invention, the truncation criterion determining the duration can be the expiry of a measuring time period that is predetermined or results from a measurement protocol fundamental to the measurement signal acquisition. In the case of a magnetic resonance measurement, the actual measurement period is yielded from the measurement protocol used, and the latter defines the relevant scanning or signal acquisition parameters, the slice thickness, slice spacing, slice number, size of the field of view etc., as also the corresponding type of measurement (T1, T2, etc.). That is to say, the likely measuring time of the magnetic resonance imaging device can already be determined when selecting the required measurement protocol.

This measuring time can now be the determining truncation criterion for the PET measurement, which is, for example, to be carried out for a specific time, for example 5 minutes. The predetermined MR measuring time is longer and therefore also defines the maximum extension of the measuring time of the PET measurement. In the reverse case, for example, it is possible for the predetermined PET measuring time to be longer than the magnetic resonance measuring time resulting from the MR protocol. In this case, the predetermined PET measuring time would then be the truncation criterion for the MR measurement, that is to say the defining criterion as to how long the MR measuring time is extended.

Alternatively, the truncation criterion determining the duration can be the reaching of an acquired minimum number of signals that is predetermined or results from a measurement protocol fundamental to the measurement signal acquisition. This truncation criterion relates to the PET measurement or, in the case of the use of SPECT detectors, the SPECT measurement. In these cases, individual measurement signals that result from a radionuclide decay accumulate over time. It is now possible to define the number of such acquired events as truncation criterion, it being assumed that when this number is reached a sufficient number of signals are provided that enable imaging with an unambiguous informativeness.

The time until the required minimum number of events has been acquired is undetermined and is a function of diverse factors such as the given radionuclide and the decay properties thereof, the examination region that is to be scanned via the PET or SPECT measurement, etc. The magnetic resonance measurement is now performed until this truncation criterion is reached, that is to say a measurement protocol is occasionally multiply processed, ultimately as a function of when the truncation criterion is reached. Here, as well, the multiple scanning necessarily leads to a potentiation of the existing image data, thus resulting in an improved image quality.

A further alternative possibility of forming the truncation criterion provides that the truncation criterion determining the duration is the reaching of a minimum signal intensity or minimum contrast that is predetermined or results from a measurement protocol fundamental to the measurement signal acquisition. Ultimately, in the case of this refinement of an embodiment of the invention the image quality used is that yielded from the continuously accumulated image data of the respective imaging device. This can be a proven truncation criterion in the case, in particular, of the PET measurement. The point is that the image quality depends decisively on the number of recorded measurement signals, that is to say the respective events. The more measurement signals can be recorded and processed, the more intense, that is to say bright, is the formation of a region in the image of the examination volume reconstructed therefrom. It is known that these regions appear bright by comparison with the substantially darker surroundings.

It is now possible to use as truncation criterion either the minimum signal intensity, that is to say the intensity or brightness of this region displayed in the image, to which end the acquired actual brightness or actual intensity is compared with a comparison value. Also conceivable, however, is a contrast comparison, that is to say the contrast that is set up between the brighter region and the darker surroundings. The term "minimum signal intensity" is thus the intensity or brightness in the respective image, while "minimum contrast" signifies the contrast between this brighter region and the darker surroundings. The use of this truncation criterion assumes that signal processing or image reconstruction is performed continuously with the aid of the recorded measurement signals in order to evaluate the measurement signals or the reconstructed image correspondingly.

In a particular refinement of an embodiment of the invention, in order to determine the truncation criterion use is made of the signal intensity or the contrast in an image produced with the aid of the measurement signals acquired by the second imaging device, one or more regions being selected on the part of the user or automatically in an overview image of the examination volume recorded by the first imaging device and registered with the image of the second imaging device in the image coordinates, and the signal intensity in the corresponding region or the signal intensity ratio of the intensities of the two corresponding regions, or the mutual contrast of the region or regions with the surroundings in the image of the second imaging device being determined, and being compared with a comparison value constituting a measure of the minimum signal intensity or the minimum contrast. When the intensity or the contrast is to be used as truncation criterion, it is possible in accordance with this refinement of the invention to define one or, for example, two specific regions that are to be considered here. Use is made for this purpose of an overview image that is usually recorded first with the aid of a magnetic resonance system.

The coordinate systems in which the two imaging devices record imaging signals correspond to one another or are registered with one another such that a unique signal assignment is possible. One or two or more regions of interest are now determined in the overview image with the aid of this coordinate system registration. These correspond, for example, to organs in which a particularly high or low activity of a radionuclide is expected, for example a region relating to the heart muscle, another region with fatty tissue, that differ from one another substantially in the PET image.

Subsequently, for example, it is possible to carry out the PET measurement until the quotient of the intensities determined for these regions, that is to say the quotient of the brightnesses in the reconstructed PET image, or, for example, also the signal-to-noise ratio overshoots a corresponding threshold value. However, this can also be performed with the aid of only a single region when the brightness thereof is being checked. It is also possible in a corresponding way to operate using the image contrast, in which case the contrast ratio of the selected region is determined in relation to the surroundings. The region or regions can be selected automatically via a suitable automatic segmentation algorithm that, for example, searches independently for corresponding organs or structures in the overview image, if appropriate as a function of a specific clinical problem, that is to say the stipulation of a specific assumed pathology that, it if applies, leads to the accumulation of radionuclides in a specific region.

However, a manual determination of region by the user is also conceivable. For example, in the case of a skeleton SPECT examination the entire skeleton can be segmented from the magnetic resonance data and be measured until a sufficient contrast is achieved between the skeleton and other tissue. Here, this selection can be performed before the measurements have begun as soon as the overview image is available. However, it is also conceivable to undertake this selection when the acquisition of the nuclear medicine PET or SPECT data is already running, this examination then continuing until the truncation criterion is actually reached.

The selected region can here be such that it is of pathological interest, consequently thus a region where an intensified accumulation of radionuclides is originally assumed, because of being pathologically conditioned, for example the region where a tumor is assumed. However, it is also conceivable to select another region, for example the bladder, in which radionuclide excreted from the body accumulates. When the radionuclide concentration in this region is sufficient, it can be assumed that an adequate amount of time has passed for it no longer to be possible for there to be enough radionuclide material in the body at the pathologically interesting sites, for which reason the measurement can then be broken off. Here, as well, use can be made as truncation criterion of the intensity of the region, that is to say brightness of the region, or contact of the region.

In a particular refinement of an embodiment of the method, the first imaging device is a magnetic resonance device and the second imaging device is a PET device, the measurement period of the PET device already finished in accordance with the measurement protocol thereof being extended until the magnetic resonance device has ended the measurement signal acquisition in accordance with the fundamental measurement protocol. Thus, the duration of the fast PET measurement is oriented here according to the duration of the MR measurement and is ended at the same time as the latter.

Alternatively, it is possible in the reverse case where use is made of a first imaging device in the form of a magnetic resonance device and of a second imaging device in the form of a PET device to extend the measuring period of the already finished magnetic resonance device in accordance with the measurement protocol thereof until the PET device has ended the measurement signal acquisition in accordance with the fundamental measurement protocol. In this case, during extension of the magnetic resonance measurement a measurement operation defined by the fundamental measurement protocol is carried out completely, the PET device finished with the measurement before the end of this extended measurement operation recording further measurement signals until the magnetic resonance measurement is ended. Thus, a quasi-iterative extension of measuring time is performed here for both imaging devices.

The measuring time of the magnetic resonance device is determined firstly by the duration of the PET measurement. For example, this may be 15 minutes, while the MR measurement lasts 10 minutes. After expiry of the 10 minutes, the MR protocol is processed once again, since the PET device has signaled that it is going to measure for a substantially longer time, specifically 15 minutes. After expiry of the PET measuring time, the PET device would now be finished although the MR protocol would not yet be completely processed.

In accordance with this variant of an embodiment of the method, the MR measurement is still ended, that is to say the main measurement protocol is completely processed. At the same time, the duration of the PET measurement is correspondingly extended, that is to say although it is already finished in accordance with the original PET protocol the PET device is still measuring further, that is to say acquires yet more image data, and this is likewise advantageous for the image quality.

If, in the course of the extension of the measurement duration of one or other of the imaging devices, movement of the patient should occur, that could disadvantageously affect the image quality, for example excessively strong breathing or the like, particularly in the region of the PET or SPECT imaging, it is then possible to undertake suitable correction measures that compensate such movements. In the case when the movement established, for example, in the magnetic resonance image data overshoots a previously set threshold value, and thus consequently becomes too strong, the acquisition of the PET or SPECT data which are then, for example, likewise impaired, and, if appropriate, also the MR measurement can be prematurely broken off and, if appropriate, restarted.

In addition to the method, an embodiment of the invention further relates to a hybrid medical imaging unit comprising a first imaging device of high spatial resolution and a second nuclear medicine imaging device of high sensitivity which respectively acquire imaging measurement signals from a common examination volume, said imaging unit being designed to carry out the method of the type described. In this case, the first imaging device can be a magnetic resonance device and the second imaging device can be a PET device.

BRIEF DESCRIPTION OF THE DRAWINGS

Further advantages, features and details of the invention follow from the example embodiment described below as well as with the aid of the drawing. The latter shows an illustration of the principle of a hybrid medical imaging unit 1 according to an embodiment of the invention, including a first imaging device 2 of high spatial resolution, a magnetic resonance device in the example shown. This is not illustrated in more detail, the basic design of such a magnetic resonance device being adequately known to the person skilled in the art.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

Provided, furthermore, is a second nuclear medicine imaging device 3, here in the form of a PET scanner including a number of individual detector elements 4 that are assembled to form a cylinder and clad the patient aperture 5. The basic design of such a PET device is also adequately known to the person skilled in the art and does not require any more detailed explanation. The operation of the first and second imaging devices 2, 3 is controlled in the example shown via a central, common control device 6 but it is also possible to provide two control devices communicating with one another.

It is possible with the aid of such an imaging device to be able to simultaneously record MR images and PET images, since the magnetic resonance imaging does not influence the PET imaging, and vice versa. As described, the control device 6 controls the operation of the two imaging devices 2, 3 and undertakes to evaluate and process the recorded measurement signals, while any possible images are displayed by being output on a monitor 7.

Each imaging device 2, 3 operates with the aid of a measurement protocol that is selected with reference to the desired examination and defines how, where, when etc. measurement signals that are subsequently processed to form an MR or PET image that can be output are to be picked up from the examination volume. The respective measuring times differ specifically in terms of protocol. According to an embodiment of the invention, the measuring time of that imaging device that is ready earlier is extended, specifically at least until the other imaging device, which measures longer in accordance with its measurement protocol, has ended the data acquisition. Different configurations are conceivable in this case.

Thus, for example, in accordance with the selected measurement protocol the MR measurement can be originally longer than the PET measurement in accordance with its measurement protocol. For example, the MR measurement may amount to 15 minutes, while the PET measurement would already be ended after 8 minutes. In this case, the control device 6, which knows the MR measuring time, automatically varies the PET measuring time correspondingly such that the latter likewise amounts to 15 minutes, that is to say the PET protocol is correspondingly adapted or changed dynamically. The truncation criterion for the PET measurement is therefore here the expiry of the MR measuring time. This is very advantageous for the PET measurement, since measuring signals are accumulated over a much longer period, and so essentially more image signals are thus present for the imaging.

Also conceivable would be the case that the PET measurement lasts longer, for example the latter being defined as 20 minutes according to protocol, while the MR measurement is substantially faster. The control device 6 now adapts the MR protocol correspondingly or controls the magnetic resonance device in such a way that the measurement protocol is repeated correspondingly frequently. If the MR measuring time is, for example, only 5 minutes according to protocol, it is possible to process four complete passes of the MR protocol in the 20 minute PET measuring time.

If the MR measuring were to amount, for example, to 8 minutes, there is the possibility of truncating the third MR measuring operation after expiry of the 20 minute PET measuring time, and there would then nevertheless be substantially more MR image signals available than in the case of only a one-off protocol pass. Alternatively, there is also the possibility of extending the PET measuring time in a quasi iterative manner, thus, in the example shown, by a further 4 minutes after expiry of the 20 minutes up to the end of the third MR measuring operation, which would then, for its part, constitute the truncation criterion. An iterative dynamic adaptation of the measuring time of the two imaging devices thus takes place here, as it were.

It would also be conceivable to make use here as truncation criterion of the image quality of, for example the PET image that can be generated from the continuously accumulated PET measurement signals, and necessarily also continuously generated PET image. To the extent that a brighter region is also formed there in a fashion resulting from an accumulation of corresponding measuring signals in this region defined via the coordinate system, the region of brightness, that is to say the signal intensity of the signals to be assigned in a cumulative fashion to this region, can be used as truncation criterion when this reaches or exceeds a specific minimum limiting value. In a corresponding way, it would also be possible here to use the contrast between this brighter region and the darker surroundings and make a comparison with a corresponding contrast comparative value.

It would, furthermore, be conceivable to make a selection in an overview image, which is generated at the beginning of the MR measurement with the aid of the magnetic resonance device 2 in order to determine possible attenuation contours with the aid thereof, of one or more regions that are to be investigated subsequently with regard to the PET intensity or the PET contrast of the PET image, in order to be able to establish the truncation criterion thereon, for example by comparison with a comparative image or the like. The coordinate systems of the magnetic resonance device 2 and the PET device 3 are registered with one another such that the respectively recorded measuring signals can be exactly assigned to one another in terms of coordinate system.

Thus, if a region is selected in the MR coordinate system, this region can be imaged exactly onto a corresponding region in the PET coordinate system. This now renders it possible, after selection of one or more regions in the MR overview image, for the control device to determine the corresponding regions—be these two or three dimensional—in the PET coordinate system, and make a check in the running reconstructed PET image of this or these regions with regard to the truncation criterion of the image quality to be evaluated, be this through the regional intensity, that is to say regional brightness or the regional contrast with the environment. If the truncation criterion is given, the MR measurement, which has already been extended because of having been finished earlier, is truncated, or the protocol still being processed is processed to the end when the PET measurement can simultaneously likewise be extended.

Finally, it is further conceivable to acquire the number of the recorded PET signals over time as truncation criterion, in order to establish whether there is a minimum number of signals and therefore a minimum number of events (counts), it being assumed here that when this minimum number of signals is reached there is a satisfactory image quality. Thus, the PET measuring time is completely undetermined here. The MR measurement is extended here until the PET measurement has reached the truncation criterion, whereupon it is possible in turn to end the MR measurement or the running protocol can still be processed.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a hybrid medical imaging unit including a first imaging device of a relatively high spatial resolution and a second nuclear medicine imaging device of a relatively high sensitivity, each imaging device for respectively acquiring imaging measurement signals from a common examination volume, the method comprising:

determining a duration of acquiring the measurement signal of one of the first imaging device and the second nuclear medicine imaging device as a function of a duration of the measurement signal acquisition of the other of the first imaging device and the second nuclear medicine imaging device, the measurement signal acquisition of said other of the first imaging device and the second nuclear medicine imaging device being defined by an occurrence of a truncation criterion, wherein the truncation criterion is an end of at least one of a first measuring time period and a second measuring time period, the first measuring period being defined by a measurement protocol and the second measuring period being a period of acquiring the measurement signal; and acquiring the respective imaging measurement signals based on the determining.

2. The method as claimed in claim 1, wherein the measurement signal acquisitions of the first imaging device and the second nuclear medicine imaging device are performed at least intermittently simultaneously.

3. A method for operating a hybrid medical imaging unit including a first imaging device of a relatively high spatial resolution and a second nuclear medicine imaging device of a relatively high sensitivity, each imaging device for respectively acquiring imaging measurement signals from a common examination volume, the method comprising:

determining a duration of acquiring the measurement signal of one of the first imaging device and the second nuclear medicine imaging device as a function of a duration of the measurement signal acquisition of the other of the first imaging device and the second nuclear medicine imaging device, the measurement signal acquisition of said other of the first imaging device and the second nuclear medicine imaging device being defined by an occurrence of a truncation criterion, wherein the truncation criterion is defined by obtaining at least one of a minimum signal intensity and a minimum contrast, the truncation criterion is based on at least one of the signal intensity and the contrast in an image produced according to the measurement signals acquired by the second imaging device, an overview image of the examination volume is recorded by the first imaging device, the overview image including image coordinates registered with image coordinates of the image recorded by the second imaging device, one or two regions of the overview image being selected either on the part of a user or automatically, and at least one of a signal intensity of a corresponding region, a signal intensity ratio of intensities of the two regions, and a mutual contrast of the one or two regions with respect to surroundings in the image of the second imaging device is determined, and compared with a comparison value constituting a measure of at least one of the minimum signal intensity and the minimum contrast.

4. A method for operating a hybrid medical imaging unit including a first imaging device of a relatively high spatial resolution and a second nuclear medicine imaging device of a relatively high sensitivity, each imaging device for respectively acquiring imaging measurement signals from a common examination volume, the method comprising:

determining a duration of acquiring the measurement signal of one of the first imaging device and the second nuclear medicine imaging device as a function of a duration of the measurement signal acquisition of the other of the first imaging device and the second nuclear medicine imaging device, the measurement signal acquisition of said other of the first imaging device and the second nuclear medicine imaging device being defined by an occurrence of a truncation criterion, wherein the first imaging device is a magnetic resonance device and the second imaging device is a PET device, wherein an actual measuring period of the PET device is extended beyond an end of a measuring time period defined by a measurement protocol of the PET device, the actual measuring period corresponding with a time when the magnetic resonance device completes the measurement signal acquisition defined by a measurement protocol for the magnetic resonance device.

5. A method for operating a hybrid medical imaging unit including a first imaging device of a relatively high spatial resolution and a second nuclear medicine imaging device of a relatively high sensitivity, each imaging device for respectively acquiring imaging measurement signals from a common examination volume, the method comprising:

determining a duration of acquiring the measurement signal of one of the first imaging device and the second nuclear medicine imaging device as a function of a duration of the measurement signal acquisition of the other of the first imaging device and the second nuclear medicine imaging device, the measurement signal acquisition of said other of the first imaging device and the second nuclear medicine imaging device being defined by an occurrence of a truncation criterion, wherein the first imaging device is a magnetic resonance device and the second imaging device is a PET device, wherein an actual measuring period of the magnetic resonance device is extended beyond an end of a measuring time period defined by a measurement protocol of the magnetic resonance device, the actual measuring period corresponding with a time when the PET device has ended the measurement signal acquisition in accordance with a measurement protocol for the PET device.

6. The method as claimed in claim 5, wherein a measurement operation defined by the measurement protocol for the PET device is carried out completely during extension of the magnetic resonance measurement, wherein, when the PET device completes the measurement before the end of this extended measurement operation, further measurement signals are recorded by the PET device until the magnetic resonance measurement is ended.

7. The method for operating a hybrid medical imaging unit including a first imaging device of a relatively high spatial resolution and a second nuclear medicine imaging device of a relatively high sensitivity, each imaging device for respectively acquiring imaging measurement signals from a common examination volume, the method comprising:

determining a duration of acquiring the measurement signal of one of the first imaging device and the second nuclear medicine imaging device as a function of a duration of the measurement signal acquisition of the other of the first imaging device and the second nuclear medicine imaging device, the measurement signal acquisition of said other of the first imaging device and the second nuclear medicine imaging device being defined by an occurrence of a truncation criterion, wherein the measurement signal acquisitions of the first imaging device and the second nuclear medicine imaging device are performed at least intermittently simultaneously, the truncation criterion is defined by obtaining at least one of a minimum signal intensity and a minimum contrast, the truncation criterion is based on at least one of the signal intensity and the contrast in an image produced according to the measurement signals acquired by the second imaging device, an overview image of the examination volume is recorded by the first imaging device, the overview image including image coordinates registered with image coordinates of the image recorded by the second imaging device, one or two regions of the overview image being selected either on the part of a user or automatically, and at least one of a signal intensity of a corresponding region, a signal intensity ratio of intensities of the two regions, and a mutual contrast of the one or two regions with respect to surroundings in the image of the second imaging device is determined, and compared with a comparison value constituting a measure of at least one of the minimum signal intensity and the minimum contrast.

8. The method as claimed in claim 2, wherein the first imaging device is a magnetic resonance device and the second imaging device is a PET device, wherein an actual measuring period of the PET device is extended beyond an end of a measuring time period defined by a measurement protocol of the PET device, the actual measuring period corresponding with a time when the magnetic resonance device completes the measurement signal acquisition defined by a measurement protocol for the magnetic resonance device.

9. The method as claimed in claim 2, wherein the first imaging device is a magnetic resonance device and the second imaging device is a PET device, wherein an actual measuring period of the magnetic resonance device is extended beyond an end of a measuring time period defined by a measurement protocol of the magnetic resonance device, the actual measuring period corresponding with a time when the PET device has ended the measurement signal acquisition in accordance with a measurement protocol for the PET device.

10. A computer readable medium including program segments for, when executed on a computer device, causing the computer device to implement the method of claim 1.

\* \* \* \* \*